(12) United States Patent
Zhong et al.

(10) Patent No.: US 10,200,329 B2
(45) Date of Patent: Feb. 5, 2019

(54) METHOD AND DEVICE FOR DETECTING ABNORMAL MESSAGE BASED ON ACCOUNT ATTRIBUTE AND STORAGE MEDIUM

(71) Applicant: TENCENT TECHNOLOGY (SHENZHEN) COMPANY LIMITED, Shenzhen, Guangdong (CN)

(72) Inventors: Qinghua Zhong, Guangdong (CN); Jinhua Wang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 503 days.

(21) Appl. No.: 14/608,353

(22) Filed: Jan. 29, 2015

(65) Prior Publication Data

US 2015/0326520 A1  Nov. 12, 2015

Related U.S. Application Data

(63) Continuation of application No. PCT/CN2013/079935, filed on Jul. 23, 2013.

(30) Foreign Application Priority Data

Jul. 30, 2012  (CN) .......................... 2012 1 0266045

(51) Int. Cl.
    *H04L 12/22* (2006.01)
    *H04L 29/08* (2006.01)
    *H04L 12/58* (2006.01)

(52) U.S. Cl.
    CPC .............. *H04L 51/22* (2013.01); *H04L 51/12* (2013.01); *H04L 67/306* (2013.01); *H04L 51/32* (2013.01)

(58) Field of Classification Search
    CPC ... H04L 63/0263; H04L 12/585; H04L 51/22; G06F 17/30011
    (Continued)

(56) References Cited

U.S. PATENT DOCUMENTS 7,752,274 B2    7/2010  Pagan
7,921,063 B1 *  4/2011  Quinlan .................. G06F 17/20
                                                           705/76

(Continued)

FOREIGN PATENT DOCUMENTS

CN    101137087    3/2008
CN    101257671    9/2008
(Continued)

OTHER PUBLICATIONS

Scott D. Anderson, Combining Evidence using Bayes' Rule, Feb. 26, 2007.*

(Continued)

*Primary Examiner* — Kevin T Bates
*Assistant Examiner* — Mark A Scott
(74) *Attorney, Agent, or Firm* — Anova Law Group, PLLC

(57) ABSTRACT

Disclosed is a method for detecting an abnormal message, comprising: diving a text of a detected message into a plurality of text segments; obtaining one or more account attributes of each text segment, and determining a publication proportion parameter corresponding to the account attributes of each text segment; determining a first factor corresponding to the account attributes of each text segment according to the publication proportion parameter; determining a second factor of the detected message according to the first factor corresponding to the account attributes of each text segment; and determining according to the second factor of the detected message whether the detected message (Continued)

is an abnormal message. Through the combination of publication account attributes of messages with undifferentiated text segmentation and the use of Bayesian algorithm, batches of junk messages of a microblog account are effectively limited, and the flexibility of junk message processing is improved.

18 Claims, 5 Drawing Sheets

(58) Field of Classification Search
USPC .......................................................... 709/206
See application file for complete search history.

(56) References Cited

U.S. PATENT DOCUMENTS

| | | | |
|---|---|---|---|
| 7,930,351 B2 | 4/2011 | Daniell et al. | |
| 2004/0260776 A1* | 12/2004 | Starbuck | G06Q 10/107 709/206 |
| 2005/0080860 A1* | 4/2005 | Daniell | G06Q 10/107 709/206 |
| 2005/0091321 A1* | 4/2005 | Daniell | H04L 51/12 709/206 |
| 2005/0262210 A1* | 11/2005 | Yu | H04L 51/12 709/206 |
| 2007/0233787 A1 | 10/2007 | Pagan | |
| 2008/0126197 A1* | 5/2008 | Savage | G06Q 50/01 705/319 |
| 2009/0077617 A1* | 3/2009 | Levow | H04L 51/12 726/1 |
| 2010/0058178 A1* | 3/2010 | Dong | G06Q 10/107 715/256 |
| 2010/0077043 A1* | 3/2010 | Ramarao | H04L 12/585 709/206 |
| 2010/0092095 A1* | 4/2010 | King | G06F 17/3061 382/229 |
| 2010/0145900 A1* | 6/2010 | Zheng | G06N 7/005 706/52 |
| 2011/0078306 A1* | 3/2011 | Krishnamurthy | G06Q 10/10 709/224 |
| 2011/0191847 A1* | 8/2011 | Davis | G06F 15/16 726/22 |
| 2012/0117059 A1* | 5/2012 | Bailey | G06Q 50/01 707/723 |
| 2012/0254333 A1* | 10/2012 | Chandramouli | G06F 17/27 709/206 |
| 2013/0191455 A1* | 7/2013 | Penumaka | H04L 67/02 709/204 |
| 2013/0191468 A1* | 7/2013 | Dichiu | G06F 17/30011 709/206 |
| 2013/0191469 A1* | 7/2013 | Dichiu | H04L 51/12 709/206 |
| 2013/0204882 A1* | 8/2013 | Blaschak | G06F 17/3053 707/751 |
| 2013/0227016 A1* | 8/2013 | Risher | G06Q 10/10 709/204 |
| 2013/0268839 A1* | 10/2013 | Lefebvre | G06F 17/21 715/234 |
| 2014/0165203 A1* | 6/2014 | Friedrichs | G06F 21/56 726/24 |
| 2015/0261773 A1* | 9/2015 | Walid | G06F 17/30719 707/769 |
| 2017/0140038 A1* | 5/2017 | Zheng | G06F 17/30864 |

FOREIGN PATENT DOCUMENTS

| | | |
|---|---|---|
| CN | 101453707 A | 6/2009 |
| CN | 101888445 | 11/2010 |

OTHER PUBLICATIONS

The State Intellectual Property Office of the People's Republic of China (SIPO) Office Action 1 for 2012102660454 dated Jun. 20, 2017 pp. 1-8.
International Search Report for PCT/CN2013/079935, dated Oct. 31, 2013, 3 pages.

* cited by examiner

METHOD AND DEVICE FOR DETECTING ABNORMAL MESSAGE BASED ON ACCOUNT ATTRIBUTE AND STORAGE MEDIUM

CROSS-REFERENCE TO RELATED APPLICATION

This application claims priority to and is a continuation of PCT/CN2013/079935, filed on Jul. 23, 2013 and entitled "METHOD, DEVICE FOR DETECTING ABNORMAL MESSAGE BASED ON ACCOUNT ATTRIBUTE AND STORAGE MEDIUM", which claims the benefit of Chinese Patent Application No. 201210266045.4 filed on Jul. 30, 2012 by Tencent Technology (Shenzhen) Co., Ltd., entitled "METHOD AND DEVICE FOR DETECTING ABNORMAL MESSAGE BASED ON ACCOUNT ATTRIBUTE", the contents of which are incorporated herein by reference in their entirety.

TECHNICAL FIELD

The present disclosure relates to the field of computer networks, and in particular, to a method and device for detecting an abnormal message based on account attributes, and a storage medium.

BACKGROUND

So far, ever-developing Internet instant messaging tools (i.e. instant messenger (IM)) have been accepted by a majority of Internet users and become necessary software tools for network users. The Internet instant messaging tool is not only used in the usual recreation and entertainment, but also widely used in the user's work. In IM software, a message chatting mode for one-to-one chatting between friends or one-to-N chatting among a group or a discussion group is mainly provided. With the continuous development of Internet applications, a microblog application similar to Twitter is also continuously developing.

Microblog is a micro blog with a high information transmission efficiency and a low information transmission bar. Users may quickly spread and transmit information through the microblog so as to expand the message chatting mode from one-to-one chatting or one-to-N chatting to one-to-infinite chatting. The one-to-infinite chatting mode means that a person can spread messages to countless people, while the person can receive messages from users at an order of more than ten thousands. However, at the same time, such application with so many users will inevitably be used by many advertisement publishers which forward a lot of advertisements or spam messages, thereby not only wasting network resources, but also affecting the user experience of the product.

In the prior art, a microblog operator collects a large number of spam messages or non-spam messages to build a spam message library and a non-spam message library. After a new message to be detected is received, a word segmentation is firstly performed on the message, then the numbers of occurrences of each word obtained from the word segmentation in normal message samples and spam message samples are obtained, and then a probability that each word belongs to a spam message is calculated, so that a probability that the received message is a spam message is calculated according to the Bayesian formula.

However, in practice, the inventor of the present invention found severe disadvantages of the above method, i.e. the method cannot handle most spam messages of microblog for main reasons below.

(1) A spam message sample library is difficult to accurately obtain.

Spam message samples in the spam message sample library are generally detected manually or detected otherwise by some behavior detection algorithms, and the time when a spam message is found is generally several hours later than the occurrence of the spam message, even misjudgments of spam messages often occur. This has a significant impact on the completeness and accuracy of the sample library, even may cause a great deviation between a probability of each word being a spam message obtained by the above method and a true value of the probability.

(2) An avoidance process is performed on spam messages and advertisements against the above word segmentation by existing spammers of the spam messages and advertisements, thereby causing that the spam messages or advertisements are not properly segmented through the above word segmentation.

The traditional detection method relies on the word segmentation performed on messages being detected, thus, before sending a spam message or advertisement, a spammer may process the spam message or advertisement in such a way of: adding one or more interfering symbols to a word or sentence or replacing a commonly used character with an uncommon homophonic character. Thus, after the word segmentation, the spam message is divided into isolated characters, which cannot be accurately matched with the words in the sample library.

SUMMARY

With a method and device for detecting an abnormal message and a storage medium provided by the present disclosure, abnormal probabilities of attributes of an account sending normal messages and an account sending spam messages are determined according to the attributes of the account, at the same time, the text of the message is divided, and Bayesian calculation is conducted according to a ratio of the total number of accounts already published the divided text segment to the number of accounts with the present account attribute, in combination with the abnormal probabilities of the attributes.

One aspect of the present disclosure provides a method for detecting an abnormal message including:

dividing a text of a message being detected into a plurality of text segments;

obtaining one or more account attributes of each text segment and determining publication proportion parameters corresponding to the respective account attributes of each text segment;

determining first factors corresponding to the respective account attributes of each text segment according to the publication proportion parameters;

determining second factors of the message being detected according to the first factors corresponding to the respective account attributes of each text segment; and determining whether the message being detected is an abnormal message according to the second factors of the message being detected.

Another aspect of the present disclosure further provides a device for detecting an abnormal message based on account attributes including: a dividing module configured to divide a text of a message being detected into a plurality of text segments; an obtaining module configured to obtain one or more account attributes of each text segment; a determining module, which is connected with both the dividing module and the obtaining module, and configured to determine publication proportion parameters corresponding to the respective account attributes of each text segment, determine first factors corresponding to the respective account attributes of each text segment according to the publication proportion parameters, determine second factors of the message being detected according to the first factors corresponding to the respective account attributes of each text segment, and determine whether the message being detected is an abnormal message according to the second factors of the message being detected.

At yet another aspect, the present disclosure further provides one or more storage media containing computer-executable instructions, where the computer-executable instructions are configured to perform a method for detecting an abnormal message, and the method includes steps of:

dividing a text of a message being detected into a plurality of text segments;

obtaining one or more account attributes of each text segment and determining publication proportion parameters corresponding to the respective account attributes of each text segment;

determining first factors corresponding to the respective account attributes of each text segment according to the publication proportion parameters;

determining second factors of the message being detected according to the first factors corresponding to the respective account attributes of each text segment; and determining whether the message being detected is an abnormal message according to the second factors of the message being detected.

Compared with the prior art, the present disclosure possesses the following benefits:

With the use of the technical solution of the present disclosure, the attributes of a publication account of a message are combined with the undiscriminating text segmentation process and the Bayesian algorithm is utilized, so that normal message samples and abnormal message samples are no longer collected, while original features of the abnormal message are remained as much as possible, thereby effectively prohibiting batches of spam messages of the microblog. Further, human or system assistances are not required to provide samples for the process of the abnormal message, thereby completely realizing a self-learning intelligentized recognition process and improving the flexibility of processing the spam messages.

DETAILED DESCRIPTION OF THE EMBODIMENTS

As discussed in the background, since the problems that the spam message sample library cannot be updated and maintained instantly and the deliberate interference with the word segmentation cannot be solved by the particular technical solutions in the prior art, the existing method for detecting an abnormal message cannot be applied to most spam messages of microblog, thus the abnormal messages cannot be effectively detected instantly.

In order to solve the above problems, a method for detecting an abnormal message is provided by the present disclosure. According to this method, it is no longer required to establish and maintain a normal message sample library or a spam message sample library, instead, abnormal probabilities of attributes of an account sending normal messages and an account sending spam messages are directly determined depending on attributes of the account, while specific word segmentation is no longer performed on new incoming messages, but text of the incoming message is directly divided, and Bayesian calculation is conducted according to a calculated ratio of the number of the accounts corresponding to a present account attribute to the total number of the historical accounts publishing the text segment divided from the message text, in combination with the abnormal probabilities of the attributes.

Figure 1:
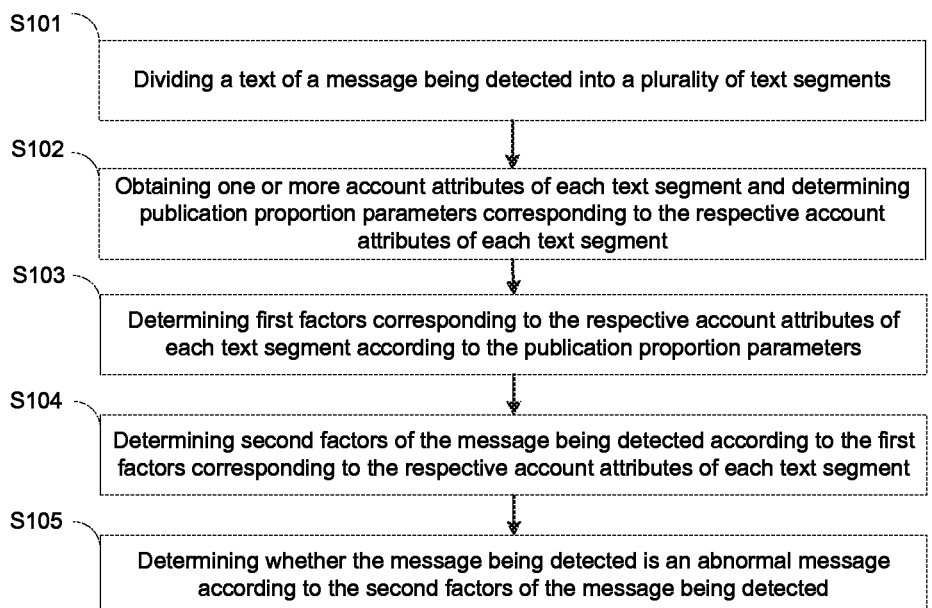
FIG. 1 is a flow chart of a method for detecting an abnormal message according to an embodiment of the present invention.

As shown in FIG. 1 which is a flow chart of a method for detecting an abnormal message provided according to an embodiment of the present invention, and the method includes the following Steps S101 to S105.

At Step S101, text of a message being detected is divided into a plurality of text segments.

Unlike in the prior art, the division of the text of the message being detected in Step S101 involves neither a specific division rule nor reference to any sample library. Therefore, there is no distinction among the text segments obtained from the division, at the same time, the specific numbers of the text segments obtained by dividing messages of different lengths can be flexibly adjusted depending on actual situations so as to achieve the best statistic effect. Such adjustment does not limit the protection scope of the present invention.

At Step S102, one or more account attributes of each text segment are obtained, and publication proportion parameters corresponding to the respective account attributes of each text segment are determined.

Since the plurality of the text segments are divided from the same message being detected and hence share the same publication account, the account attributes of each text segment may be obtained in various ways, which does not limit the protection scope of the present invention.

At Step S103, first factors corresponding to the respective account attributes of each text segment are determined according to the publication proportion parameters.

Since each account attribute of the present text segment corresponds to one first factor, the text segment corresponds to a plurality of the first factors which correspond to respective account attributes of the text segment, this is advantageous in that a person skilled in the art may perform an overall analysis or a targeted process with respect to each of the respective account attributes during the subsequent judgment.

At Step S104, second factors of the message being detected are determined from the first factors corresponding to the respective account attributes of each text segment.

It should be particularly pointed out that, in the need for simultaneous statistic calculations with respect to a plurality of account attributes, the obtaining flow of the second factor includes two manners below.

In a first manner, the second factor is determined from the first factors of the plurality of text segments with respect to each account attribute of the text segments.

In this situation, the respective first factors in Step S103 are used as input values for calculating in Step S104, and a plurality of corresponding values obtained from the calculation are taken as the second factors corresponding to the respective account attributes of the message being detected (in order to make the description below more clear, the term "second factor" is referred to as "malicious probability" hereinafter).

In a second manner, the second factor is determined from a product of the first factors corresponding to all of the account attributes of each text segment.

In this situation, a product of collected preliminary statistic calculation results (i.e. all the first factors) corresponding to all the account attributes of the present text segment is obtained, that is, only one total product corresponds to each text segment, and this product is a probability value which generally indicates whether the present text segment is from a spam message without discrimination based on the probability theory; or, a value result reflecting a malicious probability of the entire message being detected is outputted. Therefore, the method is applicable in the situation of concurrently processing a lot of messages so as to prepare for the rapid process of the messages.

At Step S105, whether the message being detected is the abnormal message is determined according to the second factors.

Compared with the prior art, the present disclosure possesses benefits below.

With the use of the technical solution of the present disclosure, the attributes of a publication account of a message are combined with the undiscriminating text segmentation process and the Bayesian algorithm is utilized, so that normal message samples and abnormal message samples are no longer collected, while original features of the abnormal message are remained as much as possible, thereby effectively prohibiting batches of spam messages of the microblog. Further, human or system assistances are not required to provide samples for the process of the abnormal message, thereby completely realizing a self-learning intelligentized recognition process and improving the flexibility of processing the spam messages.

In order to further illustrate the technical concept of the present disclosure, the technical solution of the present disclosure is illustrated with reference to particular applicable application scenarios.

In a method for detecting an abnormal message provided according to the present disclosure, by using the account attributes in a combination with the undiscriminating text segmentation process, spam messages can be effectively prohibited without importing normal message samples or spam message samples in advance.

Figure 2:
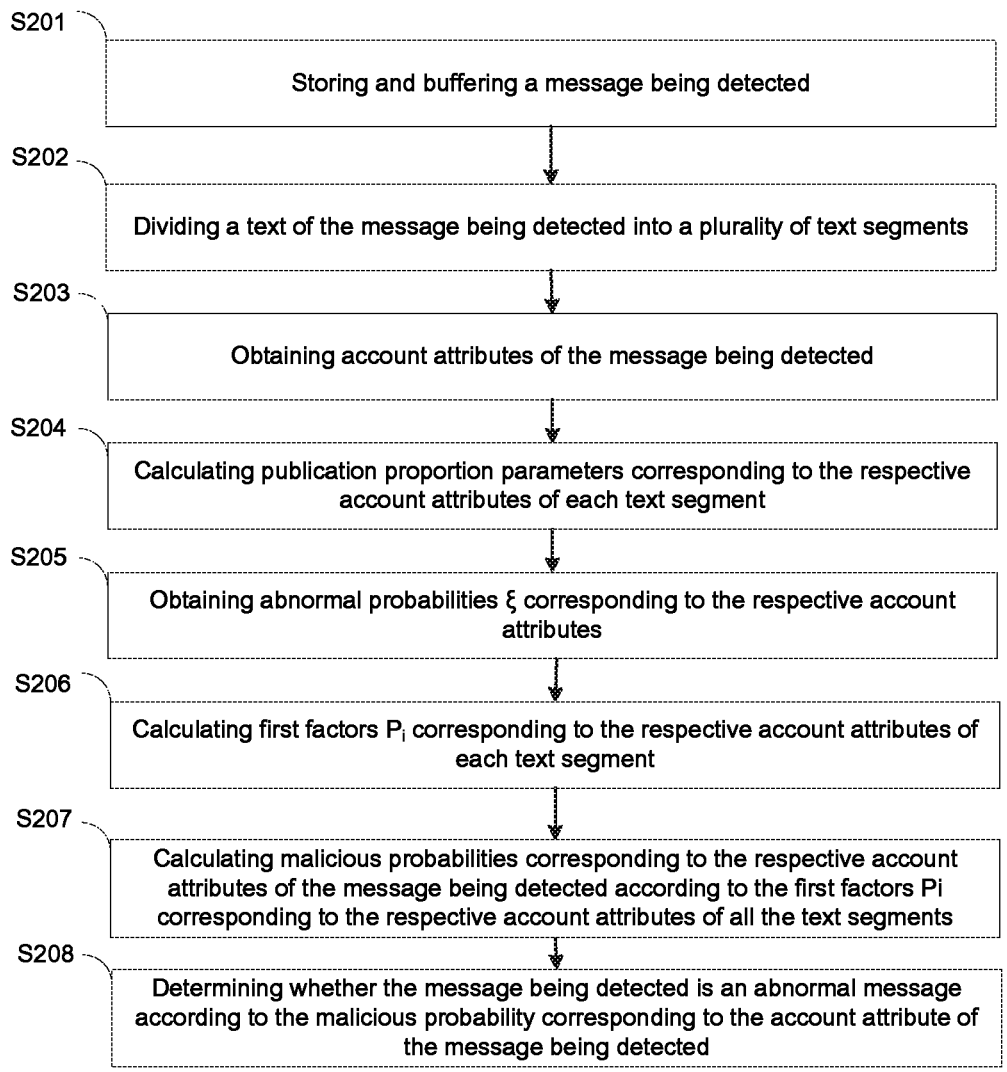
FIG. 2 is a flow chart of a method for detecting an abnormal message applicable in a specific application scenario according to an embodiment of the present invention.

As shown in FIG. 2 which is a flow chart of a method for detecting an abnormal message provided according to an embodiment of the present invention, the method includes the following Steps S201 to S208.

At Step S201, a message to be detected is received and buffered.

Figure 3:
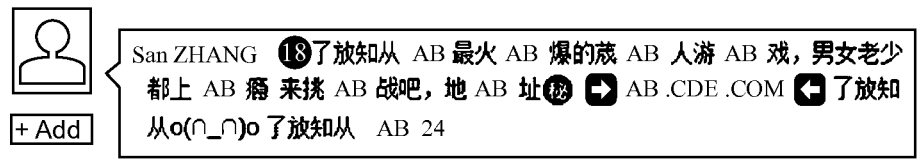
FIG. 3 is a specific example of an abnormal message in the prior art.

Specifically, a message as shown in FIG. 3 is found in the system and stored in a memory for further processing.

At Step S202, the text of the message being detected is divided into a plurality of text segments.

In the present embodiment, the text of the message is divided into text segments, each of which contains 3 to 4 bytes considering that each Chinese character occupies two bytes while each English letter occupies one byte in the GBK mode. If the message text is consisted of pure English letters, 4 bytes (i.e. 4 English letters) are divided from the message text each time to form the text segment; if one English letter and one Chinese character are to be divided from the message text, 3 bytes are divided from the message text to form the text segment; and if the message text is consisted of pure Chinese characters, 4 bytes are divided each time from the message to form the text segment, so that two Chinese characters are divided each time. Specific steps are as below.

A message text as shown in FIG. 3 is divided into text segments, i.e. "了放", "知从", "AB" (which represents a character string with 4 bytes), "最火", "AB", ""爆的", "茂 AB", "人游", "AB戏", "男女", "老少", "都上", "AB", "瘾来", "挑 AB", "战吧", "地 AB", "地", "AB.CDE.COM", "了放", "知从", "o(∩_∩)o", "了放", "知从", and "AB 24".

It should be noted that, after the message text is divided as above, each text segment may be successively shifted right by one or two bytes depending on whether the last character of the text segment is an English letter or a Chinese character, thus dividing the message text by meaning units, to involve all of possible combinations, such that the text segments without discrimination will not be affected even if a lot of word transformation interferences or word division interferences exist.

At Step S203, account attributes of the message being detected are obtained.

Since the text segments obtained from the division all come from the message published by the same account, obtaining the account attributes of the message being detected means obtaining the account attributes corresponding to each text segment. The obtained account attributes include, but are not limited to: new registration, registered address, publication time, etc.

Also, it will be appreciated by a person skilled in the art that the sequence of Step S203 and Step S204 is not limited. That is, Step S203 and Step S204 can be performed in parallel or alternately, or Step S203 and Step S204 can be swapped in sequence.

At Step S204, publication proportion parameters η corresponding to the respective account attributes of each text segment are calculated.

In Step S204, the text segments obtained from the division are stored in a hash table, the number of total users historically publishing each text segment and the total number of users which correspond to each account attribute and have published the text segment are calculated. For example, if the present account attribute is "new registration", parameters to be recorded for a certain byte segment include the total number m of user having published this byte segment and the total number n of new users having published this byte segment. Then, with the calculated statistics with respect to the attributes of the text segment in each hash table, the publication proportion parameter η of the account attribute of "new registration" of the text segment is obtained according to a formula of η=n/m. For example, if 100 user accounts have historically published the text segment "了放", and there are 90 user accounts with the account attribute of "new registration" among the 100 user accounts, the publication proportion parameter of the text segment corresponding to the account attribute of "new registration" is 90%.

Correspondingly, publication proportion parameters corresponding to other account attributes of the text segment are obtained likewise as above. The implementation of data storing and reading, lookup and statistic with respect to the hash table may refer to the prior art, and will not be repeated herein.

At Step S205, the abnormal probabilities $\xi$ corresponding to the respective account attributes are obtained.

The publication account of the message being detected has various account attributes, and abnormal probabilities corresponding to the account attributes may be given based on the previous analysis experience. For example, if the analysis on the historical spam accounts shows that accounts sending spam messages mainly are newly registered by the advertiser per se, then an abnormal probability corresponding to the account attribute of "new registration" can be set as 90%; advertising senders usually choose to send the spam messages in early morning, then an abnormal probability corresponding to the account attribute of "publication time being between 00:00 am and 4:00 am" can be set as 90%; additionally, in order to analyze and research various features of the spam messages, an abnormal probability corresponding to a certain account attribute can be preset and further adjusted according to the other account attributes and a final detection result, for example, the abnormal probability corresponding to an account attribute of "the originating location being city A" is preset as 50%, and if the final detection result shows that the message is a spam message, then it means that the advertising senders are mainly located in the city A, the abnormal probability corresponding to account attribute of "the originating location being city A" can be appropriately raised.

Further, several relatively distinct account attributes (such as new registration, publication time being the early morning) of the spam messages may be obtained in advance based on the previous detection result, then the abnormal probabilities of the relatively distinct account attributes may be directly set to 1, to rapidly process a lot of messages.

At Step S206, first factors $P_i$ corresponding to the respective account attributes of each text segment are calculated.

Based on the publication proportion parameter $\eta$ corresponding to each account attribute calculated in Step S204 and the abnormal probability $\xi$ corresponding to the account attribute as in Step S204 obtained in Step S205, the publication proportion parameter $\eta$ is multiplied by the respective abnormal probability $\xi$ in Step S205 to obtain a product corresponding to the respective account attribute, which is used as the first factor Pi corresponding to the account attribute. For example, a publication proportion parameter $\eta$ corresponding to the account attribute of "new registration" is equal to 0.9, i.e. $\eta=0.9$, and the abnormal probability $\xi$ corresponding to the account attribute of "new registration" is $\xi=1$ (i.e. 100%), the first factor corresponding to the account attribute of "new registration" is represented by Pi and $Pi=\eta*\xi=90\%$. Specifically, the first factors Pi corresponding to the respective account attributes for the present text segment are shown in Table 1.

TABLE 1

Calculating table for the first factors Pi corresponding to the respective account attributes for the present text segment

| account attributes | publication proportion parameters $\eta$ | abnormal probabilities $\xi$ | first factors Pi |
|---|---|---|---|
| new registration | $\eta_1$ | $\xi_1$ | $\eta_1*\xi_1$ |
| publication time | $\eta_2$ | $\xi_2$ | $\eta_2*\xi_2$ |
| Publication location | $\eta_3$ | $\xi_3$ | $\eta_3*\xi_3$ |
| ... | $\eta_n$ | $\xi_n$ | $\eta_n*\xi_n$ |

At Step S207, the malicious probability corresponding to each account attribute of the message being detected is calculated according to the first factors Pi corresponding to the account attribute for all of the text segments.

As per the result of Step S206, if there are N text segments $t_1, t_2, t_3, \ldots, t_n$, and the first factors corresponding to the account attribute of "new registration" of all the text segments are $P_1, P_2, P_3, \ldots, P_N$, respectively, then the calculation based on the Bayesian formula is as follows:

$$P(A|t_1,t_2,t_3 \ldots t_n)=(P_1*P_2* \ldots P_N)/[P_1*P_2* \ldots P_N+(1-P_1)*(1-P_2)* \ldots (1-P_N)],$$

where, $P(A|t_1, t_2, t_3 \ldots t_n)$ denotes the malicious probability that the message being detected is a spam message in terms of the account attribute of "new registration" when all these text segments are present in the message being detected. If the first factors corresponding to the "new registration" account attribute of all the present text segments are all 90%, and the number of the text segments is 25, the malicious probability of the message being detected, which corresponds to the account attribute of "new registration", is $P=(0.9^25)/(0.9^25+0.1^25)=100\%$.

At Step S208, whether the message being detected is an abnormal message is determined according to the malicious probabilities corresponding to the respective account attributes of the message being detected.

For example, if the malicious probability $P(A|t_1, t_2, t_3 \ldots t_n)$ corresponding to the account attribute of "new registration" is 90%, and a threshold value corresponding to any account attribute of the message being detected is 50%, the message is determined as the abnormal message.

Since each account attribute of the message being detected is subjected to a corresponding process result, a uniform processing way can be established based on the above various data values, or respective threshold values may be set based on the account attributes, or diversified rules may be taken for such processing and analyzing, the processing way can be adjusted as needed, and the criterion of the judgment and the processing way do not affect the protection scope of the present invention.

Figure 4:
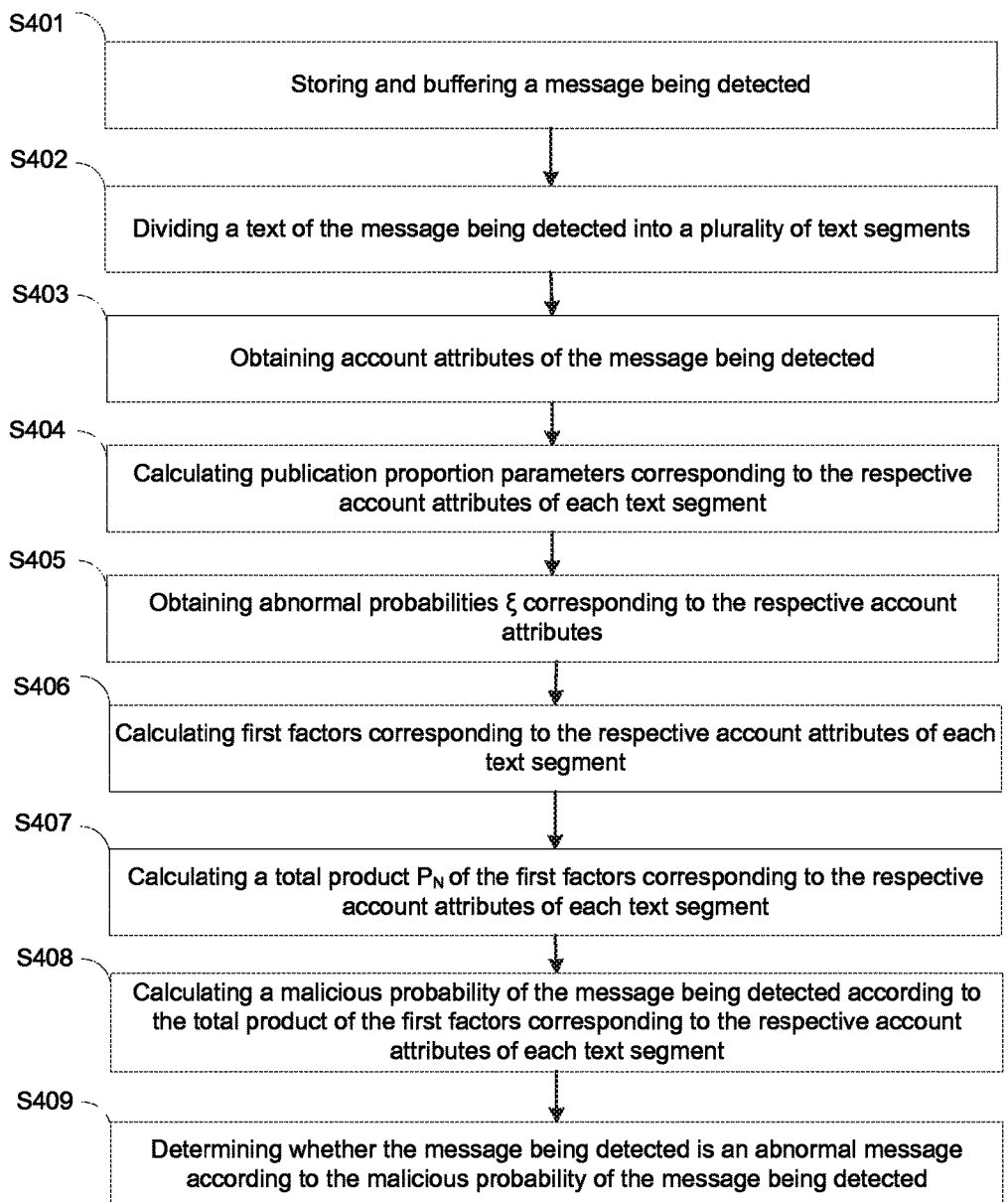
FIG. 4 is a flow chart of another method for detecting an abnormal message applicable in a specific application scenario according to an embodiment of the present invention.

As shown in FIG. 4 which is a flow chart of a method for detecting an abnormal message based on the account attributes provided according to another specific embodiment of the present invention, Steps S401 to S406 in the present embodiment are as same as Steps S201 to S206 in the embodiment above, the implementation of Steps S407 to S408 are as follows.

At Step S407, a total product $P_N$ of all of the first factors corresponding to the respective account attributes of each text segment is calculated.

Step S407 differs from step S207 in that a product of the collected publication proportion parameters $\eta$ corresponding to all of the account attributes of each text segment and the collected abnormal probabilities $\xi$ corresponding to all of the account attributes may be obtained in the present step S407, based on probability theory, whether the present text segment is a spam message is wholly reflected without discrimination based on only one total product $P_N$ corresponding to the present text segment. For example, if the present text segment has two account attributes of "new registration" and "publication time being between 00:00-4:00", the publication proportion parameter corresponding to the account attribute of "new registration" is represented by $\eta_1$ and $\eta_1=0.96$, the abnormal probability corresponding to the "new registration" account attribute is represented by $\xi_1$ and $\xi_1=1$ (i.e. 100%), the publication proportion parameter corresponding to the account attribute of "publication time being between 00:00-4:00" is represented by $\eta_2$ and $\eta_2=0.8$, the abnormal probability corresponding to the account attribute of "publication time being between 00:00-4:00" is presented by $\xi_2$ and $\xi_2=0.75$ (i.e. 75%), the total product corresponding to the text segment is presented by $P_N$ and $P_N=\eta_1 * \xi_1 * \eta_2 * \xi_2 = 0.9$. Specifically, in a case with a plurality of account attributes, the total product may be as shown in FIG. 2.

TABLE 2

Calculating table for the total product $P_N$ of the respective account attributes of the present text segment.

| Account attributes | Publication proportion parameters $\eta$ | Abnormal probabilities $\xi$ |
| --- | --- | --- |
| New registration | $\eta_1$ | $\xi_1$ |
| Publication time | $\eta_2$ | $\xi_2$ |
| Publication location | $\eta_3$ | $\xi_3$ |
| ... | $\eta_n$ | $\xi_n$ |
| Total product $P_N$ | $\eta_1 * \xi_1 * \eta_2 * \xi_1 * \eta_3 * \xi_1 \ldots \eta_n * \xi_n$ | |

At Step S408, a malicious probability of the message being detected is calculated according to the total product of the first factors corresponding to the respective account attributes of each text segment.

In step S407 based on the total product $P_N$ for each text segment output, the malicious probability of the message being detected is calculated based on a Bayesian formula $P(A|t_1, t_2, t_3 \ldots t_n) = (P_1 * P_2 * \ldots P_N) / [P_1 * P_2 * \ldots P_N + (1-P_1) * (1-P_2) * \ldots (1-P_N)]$ in the present step. Likewise, the malicious probability wholly reflects whether the message being detected is the abnormal message.

For example, in the calculation in Step S407, the total product of the first factors corresponding to the respective account attributes for the present text segment is 0.9. if the total products for all of the text segments of the message being detected are as same as each other and the total number of the text segments are 25, the whole malicious probability P of the message being detected is presented by P and $P=(0.9^{25})/(0.9^{25}+0.1^{25})=90\%$.

At Step S409, whether the message being detected is an abnormal message is determined according to the malicious probability of the message being detected.

Based on the uniqueness of the value output in Step S408, whether the malicious probability of the message being detected is larger than a preset threshold can be directly determined, thereby determining whether the detected messages is an abnormal message.

It can be seen, in the present specific embodiment, a product of collected publication proportion parameters $\eta$ corresponding to all of the account attributes and the collected abnormal probabilities corresponding to all of the account attributes $\xi$ in the process of calculating the total product $P_N$ of the first factors corresponding to the respective account attributes of each text segment is obtained, the total product $P_N$ of the each text segment and the malicious probability of the message being detected are calculated as a whole, and then whether the message being detected is an abnormal message is directly determined depending on whether the malicious probability obtained in Step S306 is larger than the threshold value, the above process method is simple, quick, and applicable to the situation that a lot of messages are needed to be processed simultaneously.

Figure 5:
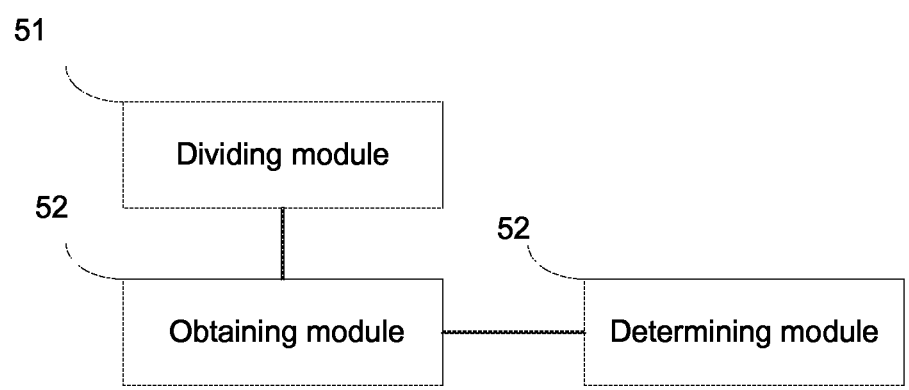
FIG. 5 is a structure diagram illustrating a device for detecting an abnormal message according to an embodiment of the present invention.

In order to realize the technical solution provided by the present disclosure, the present disclosure further provides a device for detecting abnormal messages, a specific structure diagram is shown in FIG. 5 and the device includes:

A dividing module 51 is configured to divide a text of a message being detected into a plurality of text segments.

It should be noted that the dividing module 51 involves neither a specific division rule nor reference to any sample library, the divided respective text segments are identical with each other without discrimination. Therefore, there is no distinction among the text segments obtained from the division, at the same time, the specific numbers of the text segments obtained by dividing messages of different lengths can be flexibly adjusted depending on actual situations so as to achieve the best statistic effect.

An obtaining module 52 is configured to obtain one or more account attributes of each text segment.

Since the plurality of the text segments are divided from the same message being detected and hence share the same publication account, the obtaining module 52 may directly obtain the account attributes according to the message being detected or obtain the account attributes of each text segment, such change does not affect the protection scope of the present disclosure.

A determining module 53, which is respectively communicated with both the dividing module 51 and the obtaining module 52, and configured to determine publication proportion parameters corresponding to the respective account attributes of each text segment, determine first factors corresponding to the respective account attributes of each text segment according to the publication proportion parameters, determine second factors according to the first factors corresponding to the respective account attributes of each text segment, and determine whether the message being detected is the abnormal message according to the second factor.

Corresponding to the above method, the determining module 53 is particularly configured to determine a ratio of the number of users who corresponds to same account attribute and have published the text segment to the number of total users who have published the text segment, the obtaining module 52 is simultaneously configured to obtain the abnormal probabilities corresponding to the respective account attributes.

In the specific application scenarios, if a plurality of account attributes are required during calculation, the above device further includes a calculating module 54 and two calculating methods are included as below.

In a first method, first factors are respectively determined for the respective account attributes of each text segment, that is, the product of the publication proportion parameter corresponding to each of account attributes and the abnormal probabilities corresponding to the respective account attributes are calculated.

In this situation, since each account attribute of the present text segment corresponds to one first factor, the text segment corresponds to a plurality of the first factors which correspond to respective account attributes of the text segment, this is advantageous in that a person skilled in the art may perform an overall analysis or a targeted process with respect to each of the respective account attributes during the subsequent judgment.

In a second method, a total product of the all of first factors corresponding to the respective account attributes of text segment is calculated, that is, a total product of the publication proportion parameters corresponding to all of the account attributes of each text segment and the abnormal probabilities corresponding to the account attributes is calculated.

In this situation, a product of collected preliminary statistic calculation results (i.e. all the first factors) corresponding to all the account attributes of the present text segment is obtained, that is, only one total product corresponds to each text segment, and this product is a probability value which generally indicates whether the present text segment is from a spam message without discrimination based on the probability theory; or, a value result reflecting a malicious probability of the entire message being detected is outputted. Therefore, the method is applicable in the situation of concurrently processing a lot of messages so as to prepare for the rapid process of the messages.

Based on the difference between the two process methods, the subsequent processing flow of the calculating module 54 may be divided into the two types below.

Based on the first factors corresponding to the respective account attributes of each text segment, the second factors corresponding to all of the account attributes of the message being detected are calculated by Bayesian formula.

Alternatively, based on the total product of the first factors corresponding to the respective account attributes of the text segment, the second factor of the message being detected is calculated by the Bayesian formula.

Further, the device also includes a storing module 55 which is connected with the dividing module 51 and configured to store and buffer the message being detected.

The present disclosure further provides one or more storage media containing computer-executable instructions, where the computer-executable instructions are configured to perform a method for detecting an abnormal message, and the method includes the steps below:

dividing a text of a message being detected into a plurality of text segments;

obtaining one or more account attributes of each text segment and determining publication proportion parameters corresponding to the respective account attributes of each text segment;

determining first factors corresponding to the respective account attributes of each text segment according to the publication proportion parameters;

determining second factors of the message being detected according to the first factors corresponding to respective account attributes of each text segment; and determining whether the message being detected is an abnormal message according to the second factors of the message being detected.

From the description of the above embodiment, a person skilled in the art may clearly know that the present disclosure may be realized by a hardware or a combination of a software and a hardware platform. Based on that understand, the technical solution of the present disclosure may be embodied as a software product, the software product stored in a nonvolatile storage medium (such as CD-ROM, U drive or mobile hard disk etc.) includes a plurality of computer devices (such as personal computer, server or network equipment etc.) to perform the method of the respective implementation scenarios.

A person skilled in the art may be understood that the drawings are schematic diagrams of the preferred implementation scenarios, the modules or the flows in the drawings may be not necessary for the implementation of the present disclosure.

A person skilled in the art may be understood that the modules of the device of the implementation scenarios may be disposed in the device of the implementation scenarios depending on the description of the implementation scenarios. The module of the above implementation scenarios may be integrated as one module and may be divided into a plurality of submodules.

The sequence numbers of the above embodiments are just used for the description, but do not indicate the superiority of the embodiments.

The above description only shows some embodiments of the present disclosure, rather than limiting the scope of the present disclosure. Various modifications, equivalent substitutions and improvements made to the embodiments in light of spirit and principle of the present disclosure without departing from the disclosures of the invention all fall into the protection scope of the invention.

What is claimed is:

1. A method for detecting an abnormal message, comprising:

dividing, using a hardware processor, a text of a message being detected into a plurality of text segments, each divided text segment contains 3 or 4 bytes;

after dividing the text into the plurality of text segments, successively shifting each divided text segment to a right direction by one byte or two bytes depending on whether a last character of the divided text segment is an English letter or a Chinese character;

obtaining, using the hardware processor, one or more account attributes of each text segment of the shifted text segments and determining publication proportion parameters corresponding to the respective account attributes of each text segment, wherein:

an account attribute of a text segment describes a user account that published the text segment, and the one or more account attributes include at least one category of registration history, registered address, and publication time;

determining, using the hardware processor, first factors corresponding to the respective each account attributes of each text segment according to the publication proportion parameters, wherein the publication proportion parameter corresponding to an account attribute is a ratio of a number of user accounts that match the account attribute and have published the text segment to a total number of user accounts that have published the text segment;

determining, using the hardware processor, second factors of the message being detected by incorporating the first factors corresponding to each of the respective account attributes of all text segments or by incorporating the first factors corresponding to all account attributes of each text segment, wherein the second factors are malicious probabilities indicating the text being an abnormal message; and determining, using the hardware processor, whether the message being detected is an abnormal message according to the second factors of the message being detected, wherein the message being detected is determined as an abnormal message when at least one of the second factors is greater than a threshold value.

2. The method according to claim 1, wherein determining the first factors corresponding to the respective account attributes of each text segment according to the publication proportion parameters comprises:

obtaining abnormal probabilities corresponding to the respective account attributes, and determining a product of the publication proportion parameter corresponding to each of the account attributes of each text segment and the abnormal probability corresponding to the account attribute as the first factor corresponding to the account attribute of the text segment.

3. The method according to claim 2, wherein the determining the second factors of the message being detected according to the first factors corresponding to the respective account attributes of each text segment further comprises:

calculating a total product of all of the first factors corresponding to the respective account attributes of the text segment; and calculating a second factor of the message being detected by a Bayesian formula based on the total product of all of the first factors corresponding to the respective account attributes of the text segment.

4. The method according to claim 2, wherein the determining the second factors of the message being detected according to the first factors corresponding to the respective account attributes of each text segment comprises:

calculating the second factor corresponding to each account attribute of the message being detected by a Bayesian formula based on the first factors corresponding to the account attribute of all the plurality of text segments.

5. The method according to claim 3, wherein the determining whether the message being detected is the abnormal message according to the second factors of the message being detected comprises:

determining whether the second factor of the message being detected exceeds a threshold value, and if the second factor exceeds the threshold value, determining the message being detected as the abnormal message.

6. The method according to claim 4, wherein the determining whether the message being detected is an abnormal message according to the second factors of the message being detected comprises:

respectively determining whether the second factor corresponding to each of one or more of the account attributes of the message being detected exceeds a threshold value, and if the second factor corresponding to any of the one or more of the account attributes of the message being detected exceeds the threshold value, determining the message being detected as the abnormal message;

or, determining whether a product of the second factors corresponding to the respective account attributes of the message being detected exceeds a threshold value, and if the product exceeds the threshold value, determining the message being detected as the abnormal message.

7. The method according to claim 4, wherein, the calculating Bayesian formula for the calculation is:

$$P(A|t_1,t_2,t_3 \ldots t_n) = (P_1 * P_2 * \ldots P_N) / [P_1 * P_2 * \ldots P_N + (1-P_1) * (1-P_2) * \ldots (1-P_N)],$$

wherein, $P(A|t_1, t_2, t_3 \ldots t_n)$ denotes the second factor of the message being detected, and $P_N$ denotes the first factor or the total product of the first factors.

8. The method according to claim 1, wherein obtaining one or more account attributes of each text segment includes:

in response to determining that a user account that published one text segment is a new account that was registered within a certain time range, obtaining an account attribute in the registration history category of the one text segment as new account.

9. The method according to claim 1, wherein obtaining one or more account attributes of each text segment includes:

in response to determining that a user account that published one text segment was registered by a user that is located within a certain address range, obtaining an account attribute in the registered address category of the one text segment as the certain address range.

10. The method according to claim 1, wherein obtaining one or more account attributes of each text segment includes:

in response to determining that a user account published one text segment within a certain time range of a day, obtaining an account attribute in the publication time category of the one text segment as the certain time range.

11. The method according to claim 10, wherein the certain time range is between 00:00 am to 04:00 am at a local time.

12. The method according to claim 1, wherein dividing the text of the message comprises:

if the text includes pure English letters, dividing 4 bytes from the text to form a text segment;

if the text includes one English letter and one Chinese letter, dividing 3 bytes from the text to form a text segment; and if the text includes pure Chinese characters, dividing 4 bytes from the text to form a text segment.

13. A device for detecting an abnormal message based on account attributes, comprising one or more hardware processors, and memory, wherein the one or more hardware processors are configured to:

divide a text of a message being detected into a plurality of text segments, each divided text segment contains 3 or 4 bytes;

after dividing the text into the plurality of text segments, successively shift each divided text segment to a right direction by one byte or two bytes depending on whether a last character of the divided text segment is an English letter or a Chinese character;

obtain one or more account attributes of each text segment of the shifted text segments, wherein:
an account attribute of a text segment describes a user account that published the text segment, and
the one or more account attributes include at least one category of registration history, registered address, and publication time;

determine publication proportion parameters corresponding to the respective account attributes of each text segment, wherein the publication proportion parameter corresponding to an account attribute is a ratio of a number of user accounts that match the account attribute and have published the text segment to a total number of user accounts that have published the text segment;

determine first factors corresponding to the respective account attributes of each text segment according to the publication proportion parameters;

determine second factors of the message being detected by incorporating the first factors corresponding to each of the respective account attributes of all text segments or by incorporating the first factors corresponding to all account attributes of each text segment, wherein the second factors are malicious probabilities indicating the text being an abnormal message; and determine whether the message being detected is an abnormal message according to the second factors of the message being detected, wherein the message being detected is determined as an abnormal message when at least one of the second factors is greater than a threshold value.

14. The device according to claim 13, wherein, the one or more hardware processors are further configured to obtain abnormal probabilities corresponding to the respective account attributes.

15. The device according to claim 14, wherein the one or more processors are configured to determine a product of the publication proportion parameter corresponding to each of the account attributes of each text segment and the abnormal probability corresponding to the account attribute as the first factor corresponding to the attribute of the text segment, or further calculate a total product of the all of the first factors corresponding to the respective account attributes of the text segment.

16. The device according to claim 15, wherein, the one or more hardware processors are further configure to calculate the second factor corresponding to each account attribute of the message being detected by a Bayesian formula based on the first factors corresponding to the account attribute of all the plurality of text segment;

or, calculate a second factor of the message being detected by the Bayesian formula based on the total product of all of the first factors corresponding to the respective account attributes of the text segment.

17. The device according to claim 16, wherein the one or more processors are configured to store and buffer the message being detected.

18. A non-transitory computer-readable medium having stored thereon computer-executable instructions that, when executed by a hardware processor of a cloud server, cause the hardware processer to perform a method for detecting an abnormal message, the method comprising:

dividing a text of a message being detected into a plurality of text segments, each divided text segment contains 3 or 4 bytes;

after dividing the text into the plurality of text segments, successively shifting each divided text segment to a right direction by one byte or two bytes depending on whether a last character of the divided text segment is an English letter or a Chinese character;

obtaining one or more account attributes of each text segment of the shifted text segments and determining publication proportion parameters corresponding to the respective account attributes of each text segment, wherein:

an account attribute of a text segment describes a user account that published the text segment, and the one or more account attributes include at least one category of registration history, registered address, and publication time;

determining first factors corresponding to the respective account attributes of each text segment according to the publication proportion parameters, wherein the publication proportion parameter corresponding to an account attribute is a ratio of a number of user accounts that match the account attribute and have published the text segment to a total number of user accounts that have published the text segment;

determining second factors of the message being detected by incorporating the first factors corresponding to each of the respective account attributes of all text segments or by incorporating the first factors corresponding to all account attributes of each text segment, wherein the second factors are malicious probabilities indicating the text being an abnormal message; and determining whether the message being detected is an abnormal message according to the second factors of the message being detected, wherein the message being detected is determined as an abnormal message when at least one of the second factors is greater than a threshold value.

* * * * *